(12) United States Patent
Lin et al.

(10) Patent No.: US 6,472,630 B1
(45) Date of Patent: Oct. 29, 2002

(54) ELECTRICAL DISCHARGE POWER SUPPLY MODULAR DEVICE FOR ELECTRICAL DISCHARGE MACHINE

(75) Inventors: Jui-Kuan Lin, Taichung (TW); Yung-Feng Nien, Kaohsiung (TW); Chao-Shiu Lee, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 70 days.

(21) Appl. No.: 09/713,248

(22) Filed: Nov. 16, 2000

(51) Int. Cl.$^7$ ................................................ B23H 1/02
(52) U.S. Cl. ................................................ 219/69.13
(58) Field of Search ........................... 219/69.13, 69.18

(56) References Cited

U.S. PATENT DOCUMENTS

| | | | | |
|---|---|---|---|---|
| 3,987,271 A | * | 10/1976 | Bell, Jr. et al. | 219/69.13 |
| 4,151,388 A | * | 4/1979 | Bell, Jr. et al. | 219/69.13 |
| 4,443,682 A | * | 4/1984 | Ho | 219/69.13 |
| 4,490,795 A | * | 12/1984 | Calcagno | |
| 4,952,790 A | * | 8/1990 | Futamura | 219/69.13 |
| 6,177,783 B1 | * | 1/2001 | Donohue | |
| 6,289,467 B1 | * | 9/2001 | Lewis et al. | |

* cited by examiner

Primary Examiner—Geoffrey S. Evans
(74) Attorney, Agent, or Firm—Rabin & Berdo, P.C.

(57) ABSTRACT

An electrical discharge power supply modular device for electrical discharge machine includes at least a discharge power supply motherboard having a discharge power supply control signal bus and a plurality of coupling devices of discharge power supply circuits for flexibly accommodating several discharge power supply modules, finishing circuit modules, and special processing circuit modules to form a multistage discharge power supply controlled by a discharge signal generator for providing discharge clock pulses to all the discharge power supply circuits so as to proceed electrical discharge.

13 Claims, 7 Drawing Sheets

ELECTRICAL DISCHARGE POWER SUPPLY MODULAR DEVICE FOR ELECTRICAL DISCHARGE MACHINE

BACKGROUND OF THE INVENTION

1. Field of the Invention

This invention relates generally to an electrical discharge machine, particularly to a power supply module of an electrical discharge machine.

2. Description of the Prior Art

An electrical discharge machine (EDM) is considered an indispensable tool for processing molds nowadays, and the working conditions of a discharge power supply concerns with the surface coarseness of worked pieces, processing efficiency, electrode and energy consumption, etc.

As illustrated in FIGS. 2A and 2B, during discharge processing, the surface characteristics of a worked piece depends on the peak value ($I_p$) and pulse width ($\tau_p$) of the discharge current while the processing efficiency on the break time ($\tau_r$), and a discharge circuit is provided for control of the waveform of the discharge current to meet various requirements.

Referring to FIGS. 1, 2A, and 2B, the discharge circuit is mainly composed of a direct current (DC) discharge power supply, a limit resistor (R), a transistor (T1), and diodes (D1, D2) in connection with a working electrode P for preventing any reverse current. If the transistor (T1) is turned on, a DC voltage will be generated between two electrodes (P) to create discharge phenomenon, usually expressed in sparks, in case the gap between those electrodes is narrow enough, then, after time τp+τn has elapsed, the transistor (T1) is turned off to have the current paused. When the transistor is controlled in such a way repeatedly, a train of waveforms of discharge current as shown in FIGS. 2A and 2B can be obtained.

The discharge power supply of EDM generally comprises a high-voltage and a low-voltage circuit (90), (91) concurrently as shown in FIG. 3, wherein a high-voltage power supply (VH) rated 100V~200V serves for an arc introducer to raise the discharge efficiency and stability while a low-voltage power supply (VL) rated 60V~100V is used to provide electric energy for discharge processing in different current stages.

Practically, a discharge power supply board or two are made according to predetermined energy stages for disposing the high-voltage and the low-voltage discharge circuit (90), (91) together in one board or separately in two boards and wire-coupled with a control signal (94), a DC power supply, a limit resistor, a discharge electrode (95), and a workbench (96) to form a discharge power supply system, which is somewhat petrified for expansion and installation basing on planned stages of discharge voltage and current with complicated wiring and rather difficult maintenance.

In view of abovesaid defects, after years of constant effort in research, the inventor of this invention has consequently developed and proposed a module mechanism of discharge power supply system.

SUMMARY OF THE INVENTION

The primary object of this invention is to provide an electrical discharge power supply modular device for building discharge power supply in a module for easy installation and maintenance.

Another object of this invention is to provide an electrical discharge power supply modular device for building and adjusting a plurality of discharge power supply modules by using a discharge power supply module setting device for flexibly splicing an expandable multistage discharge power supply.

Yet another object of this invention is to provide an electrical discharge power supply modular device for reducing wiring and inductive effect.

A further object of this invention is to provide an electrical discharge power supply modular device fit for mold-engraving discharge, fine-hole discharge, etc.

For realizing abovesaid objects, an electrical discharge power supply modular device for electrical discharge machine comprises at least a discharge power supply motherboard having a discharge power supply control signal bus and a plurality of coupling devices of discharge power supply circuits for flexibly accommodating several discharge power supply modules, finishing circuit modules, and special processing circuit modules to form a multistage discharge power supply controlled by a discharge signal generator for providing discharge clock pulses to all the discharge power supply circuits so as to proceed electrical discharge.

For more detailed information regarding this invention together with further advantages or features thereof, at least an example of preferred embodiment will be elucidated below with reference to the annexed drawings.

BRIEF DESCRIPTION OF THE DRAWINGS

The related drawings in connection with the detailed description of this invention, which is to be made later, are described briefly as follows, in which.

DETAILED DESCRIPTION OF THE PREFERRED EMBODIMENT

Figure 1:
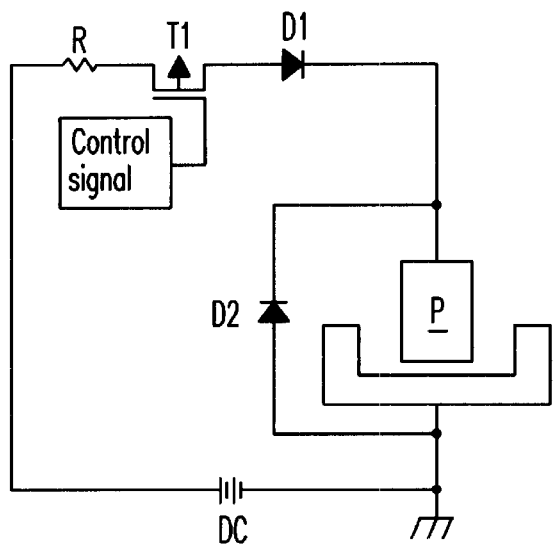
FIG. 1 is the basic discharge circuit of a conventional electrical discharge machine.
Figure 2A:
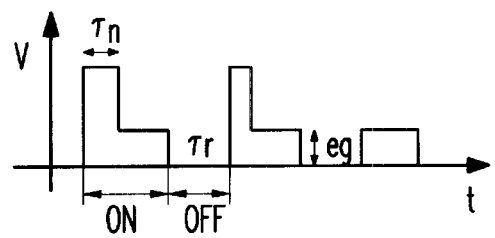
FIGS. 2A and 2B show the discharge waveforms of the conventional electrical discharge machine.
Figure 2B:
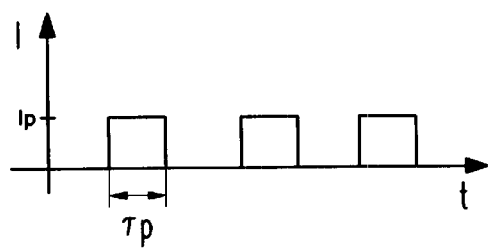
Figure 3:
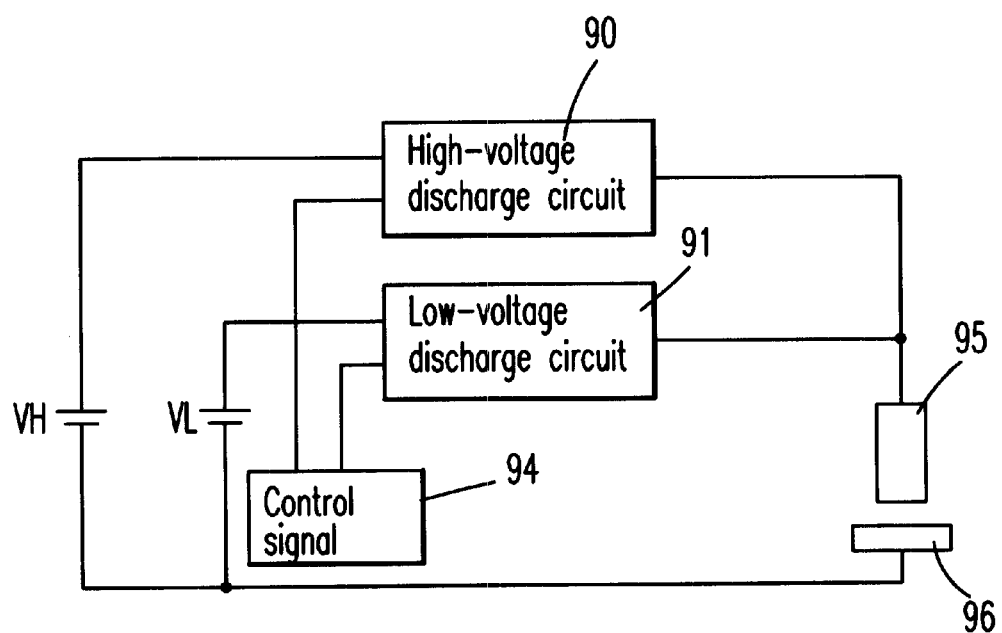
FIG. 3 is a block diagram showing disposition of power system of the conventional electrical discharge machine.
Figure 4:
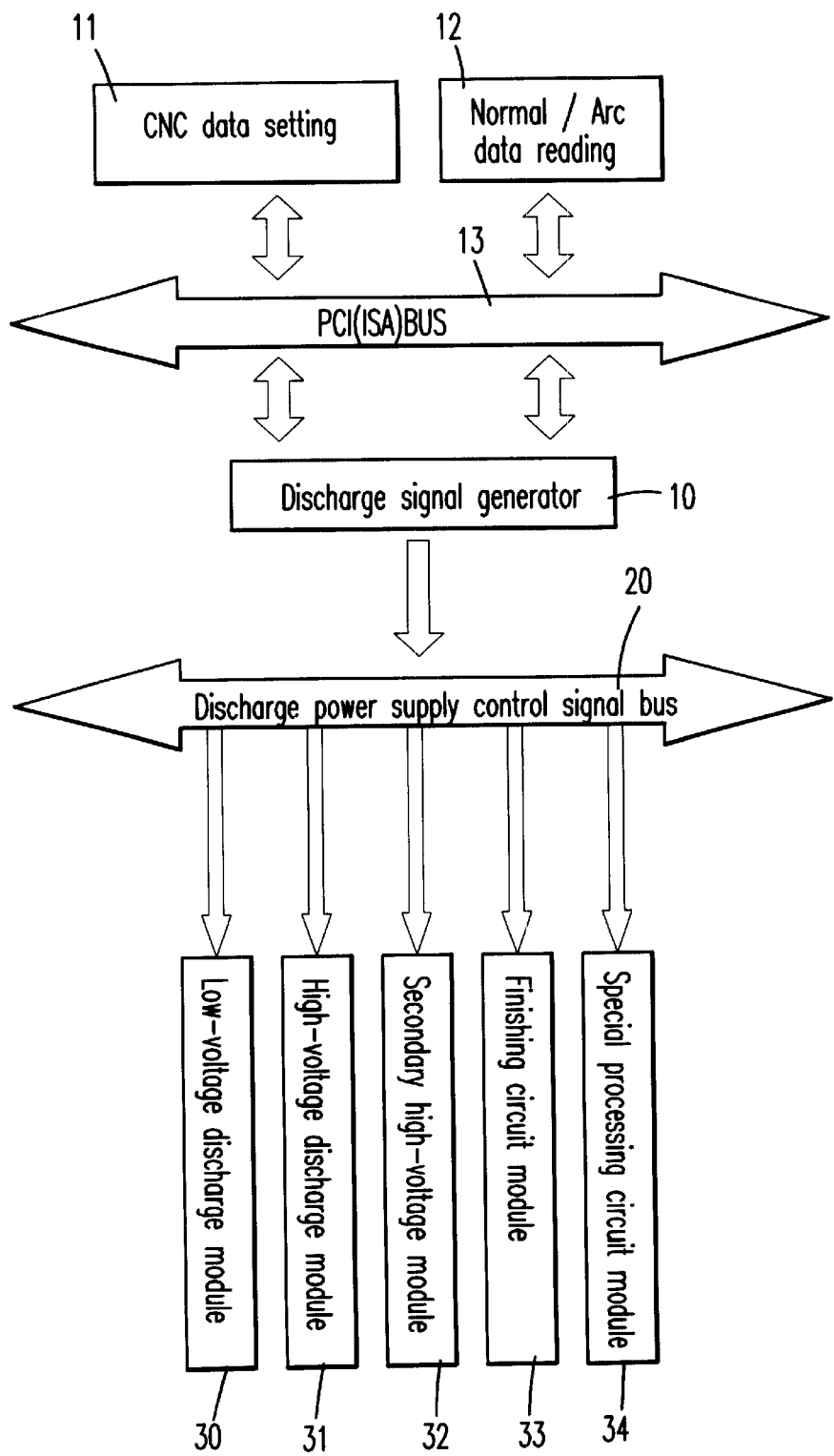
FIG. 4 is a block diagram showing the system framework of a power supply modular device of the present electrical discharge machine.

In a framework of electrical discharge power supply modular device shown in FIG. 4, an output control signal created from a discharge signal generator 10 is forwarded to a plurality of discharge power supply modules, including: a low-voltage discharge module 30, a high-voltage discharge module 31, a secondary high-voltage module 32, a finishing circuit module 33, and a special processing circuit module 34, via an electrical discharge control signal bus 20, wherein the discharge power supply modules are adjusted and set by a discharge power supply module setting device disposed on a discharge power supply module board; and value of a computer numerical control (CNC) data setting 11 and a normal/arc data setting 12 are forwarded to the discharge signal generator 10 through a peripheral component interconnect (PCI) bus (or an industry standard architecture (ISA) bus) 13 to enable a discharge power supply to proceed work with requested discharge energy according to the set CNC data.

Figure 5:
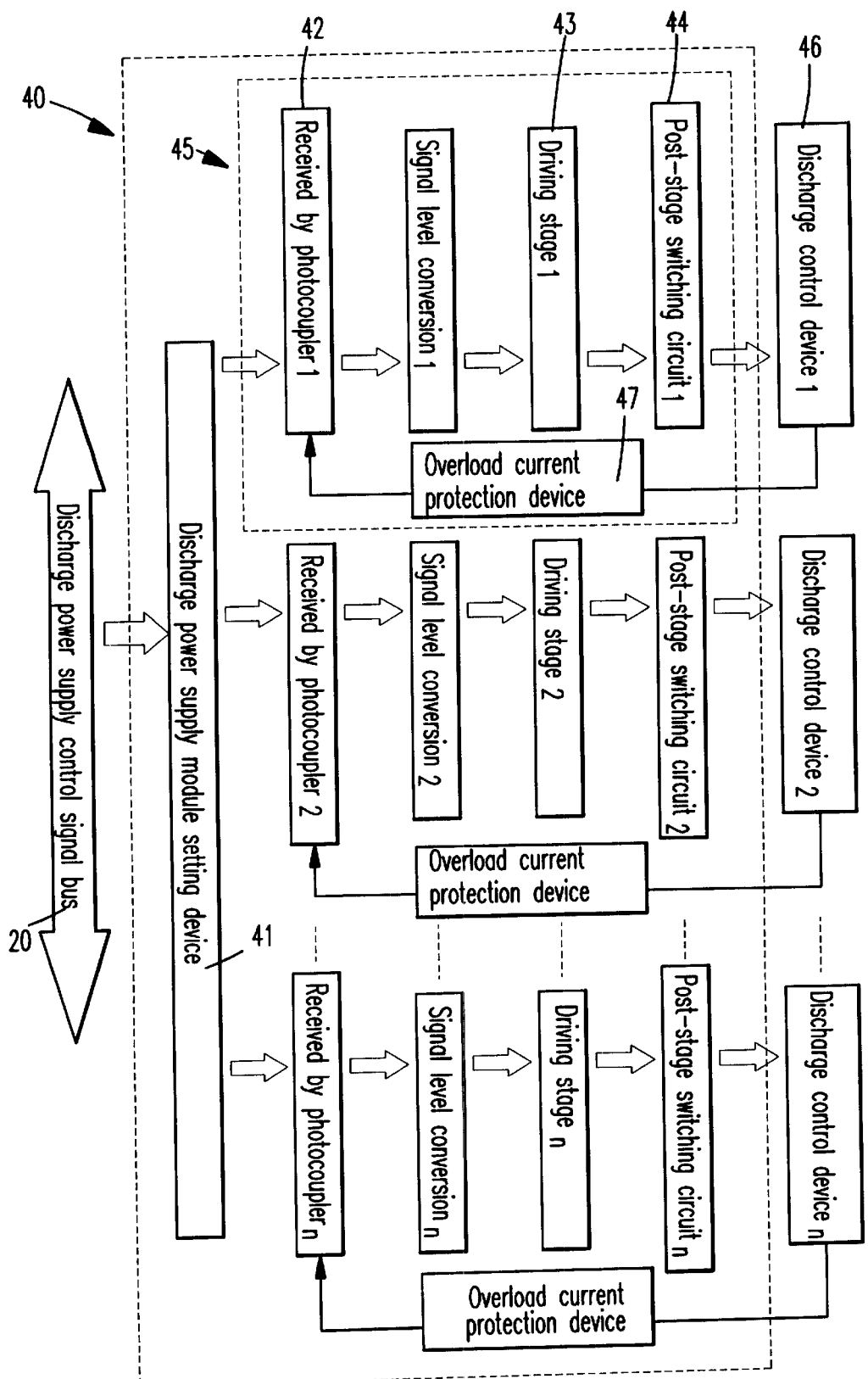
FIG. 5 is a block diagram showing the hardware framework of a power supply module board of the present electrical discharge machine.
Figure 6:
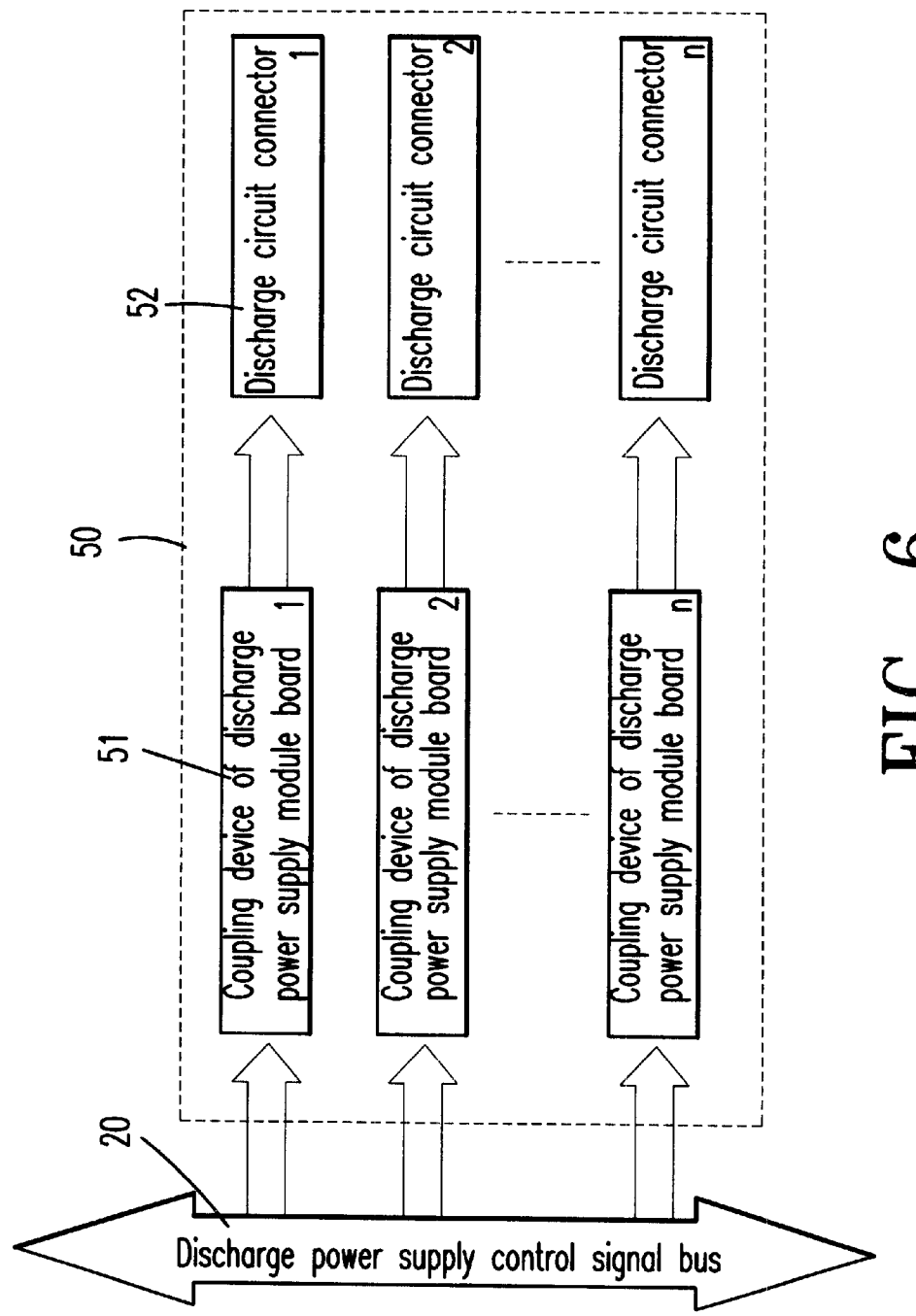
FIG. 6 is a block diagram showing the hardware framework of a power supply motherboard in the power supply modular device of the present electrical discharge machine.

For realizing the framework of this invention mentioned above, the discharge power supply module is made comprising: a discharge power supply module board 40 shown in FIG. 5 and a discharge power supply motherboard 50 shown in FIG. 6.

In reference to FIGS. 4 and 5, the discharge power supply module board 40 may have the low-voltage discharge module 30, the high-voltage discharge module 31, the secondary high-voltage module 32, etc., set by adjusting a discharge power supply module setting device 41, also have an optimum amount and positions of the module board 40 itself determined to facilitate installation and maintenance of the discharge system. In addition, the finishing circuit module 33 is good at fine processing job while the special processing circuit module 34 is capable of providing special discharge waveforms for mirror processing, special material processing, etc., to enlarge application flexibility.

The discharge power supply module board 40 is to supply energy required to an electrical discharge machine by taking advantage of an output control signal released from the discharge signal generator 10 and transmitted through a discharge power supply control signal bus 20 so as to switch ON/OFF at a proper speed. Further, the discharge power supply module board 40 will assort and distribute the signal delivered in the discharge power supply control signal bus 20 to a specified photocoupler 42 via the discharge power supply module setting device 41. The signal is then converted in the photocoupler 42 to offer a signal level acceptable to a driving stage 43 in order to drive a post-stage switching circuit 44. A discharge circuit is now coupled intermittently with the drain (D) and the source (S) of a metal oxide semiconductor field effect transistor (MOSFET) for generating discharge pulses. Moreover, the small letter "n" shown in FIG. 5 denotes the quantity of the discharge power supply depending on: the size of the discharge power supply module board 40, the amount of parallel signals provided to the coupling of the discharge power supply control signal bus 20, and the rated maximum current.

Each the discharge power supply module board 40 may comprise a plurality of discharge control units 45 whose discharge-current stages, power supply modes and functions (high voltage, low voltage, secondary high voltage, finishing, and special, etc.) are set via the discharge power supply module setting device 41 according to system specifications of the discharge power supply so that the signal in the discharge power supply control signal bus 20 can be decoded and forwarded to a due control unit 45 to further control waveform and amplitude of the discharge current.

For protecting the transistor against surge produced in ON/OFF switching, the post-stage switching circuit 44 has adopted a snubber circuit for lowering surge amplitude and frequency. Also, a discharge control device 46 is arranged to feedback the discharge current of each control unit 45 in the discharge power supply module board 40 to the photocoupler 42 through an overload current protection device 47 for current comparison. In case the discharge current is larger than the rated maximum value, a signal will be forwarded from the overload current protection device 47 to disable the photocoupler 42 for signal reception to thereby turn off the post-stage power MOSFET to cease the discharge current until another signal of the overload current protection device 47 is again provided to enable when discharge current is lower than the rated maximum value and validate the photocoupler 42.

In FIGS. 4 and 6, the discharge power supply motherboard 50 provides the discharge power supply control signal bus 20 and the framework for connection of discharge circuits to allow flexible arrangement of the discharge power supply module board 40, the finishing circuit module 33, and the special processing circuit module 34 to become a universal discharge power supply module.

As illustrated in FIG. 6, the discharge power supply motherboard 50 is designed to receive the discharge power supply control signal of the discharge signal generator 10, and provide a discharge circuit connector 52 as well as a plurality of coupling devices 51 of the discharge power supply module boards 40, wherein all the coupling devices 51 are connected to the discharge power supply control signal bus 20 and programmed in the sequence of secondary high-voltage discharge, high-voltage discharge, low-voltage discharge, and finishing circuit module to have each piece of the discharge power supply module boards 40 disposed in place. In FIG. 6, "n" represents the quantity of the jointed discharge power supply module board 40, which depends on the rated maximum current of connector jointed to the discharge power supply control bus 20 and the size of the discharge power supply motherboard 50. In the discharge circuit, a plurality of different limit resistors is disposed to joint with each discharge circuit connector 52 in the discharge power supply motherboard 50 for design of different current stages, wherein the discharge current of each stage should not exceed the maximum rated current of the MOSFET transistor, and the power consumption should be taken into consideration in selection of the limit resistors to avoid overheat of the resistors.

Figure 7:
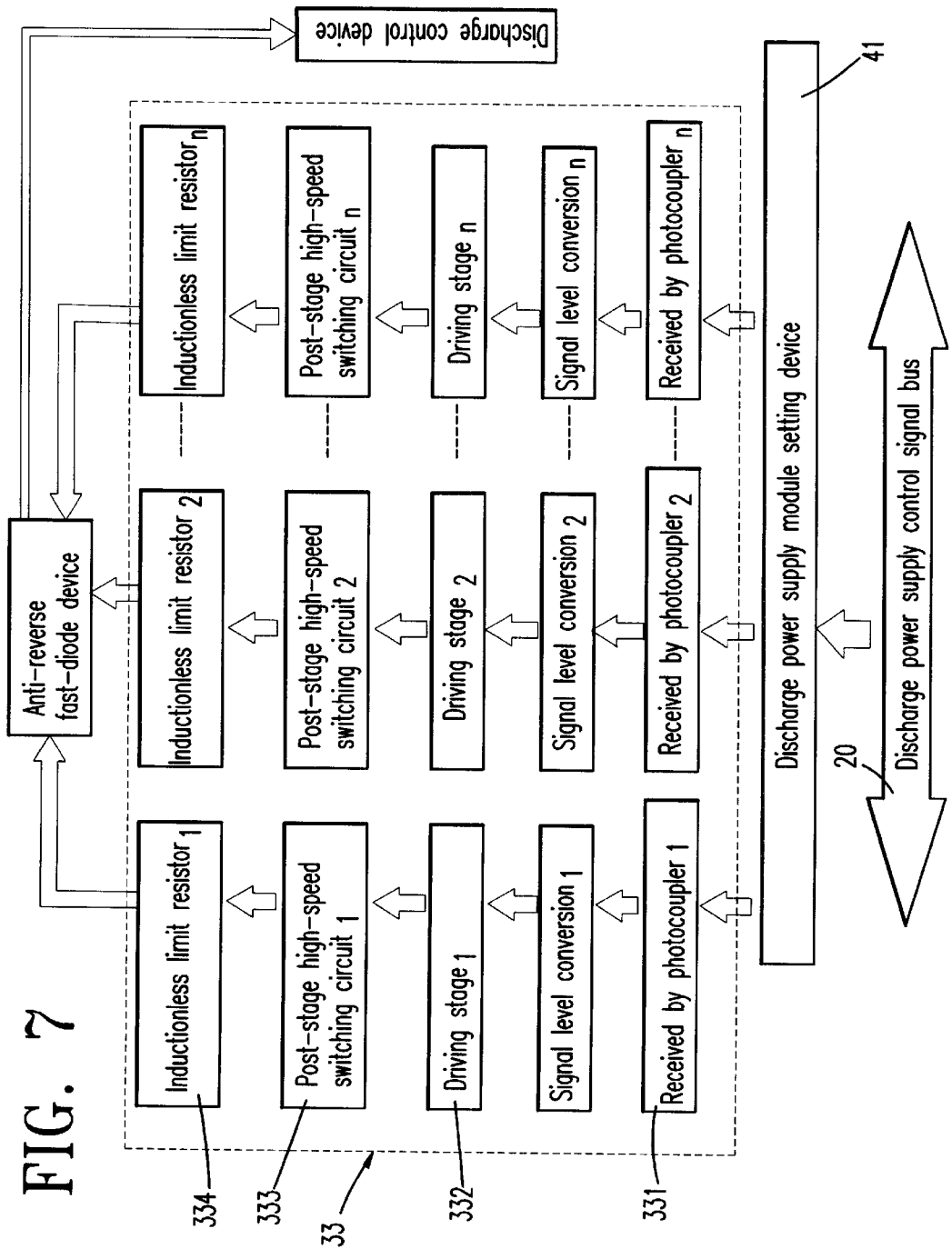
FIG. 7 is a block diagram showing the hardware framework of a finishing module board in the power supply modular device of the present electrical discharge machine.

In FIG. 7, a block diagram showing the hardware framework of a finishing module board in a power supply modular device of this invention, the processing time (Ton) is about 1 $\mu$s the most, it requires a discharge circuit with faster response capability at rising and falling edges, hence, a capacitor with smaller capacitance would work better, and the finishing circuit module 33 is independently developed and fixedly jointed to the discharge power supply motherboard 50 for control of the discharge finishing job. Besides, considering the face the narrow bandwidth discharge current is required, the discharge power supply of 140V is suggested for easy arc introduction.

After the finishing circuit module 33 has received a control signal, the control signal will undergo a photocoupler 331 for being converted into a signal level acceptable to a driving stage 332 for driving a post-stage high-speed switching circuit 333, wherein the MOSFET transistor used in the switching circuit 333 must be responsive to high-speed switch, and delay at rising edge (turn the transistor "on") and falling edge (turn the transistor "off") must be reduced as shorter as possible. For upgrading the response, a high-speed gate drive circuit is considered a key point.

As a low impedance driving circuit is preferred for the MOSFET transistor to execute high-speed switching operation, which is particularly conspicuous in delay when the transistor is turned off, a limit resistor, especially the inductionless, is preferably disposed on board the finishing circuit module 33.

The small letter "n" in FIG. 7 represents the quantity of the finishing circuit module 33, and is dependent on the size of the finishing circuit board and the system reguires finishing current stages.

Figure 8:
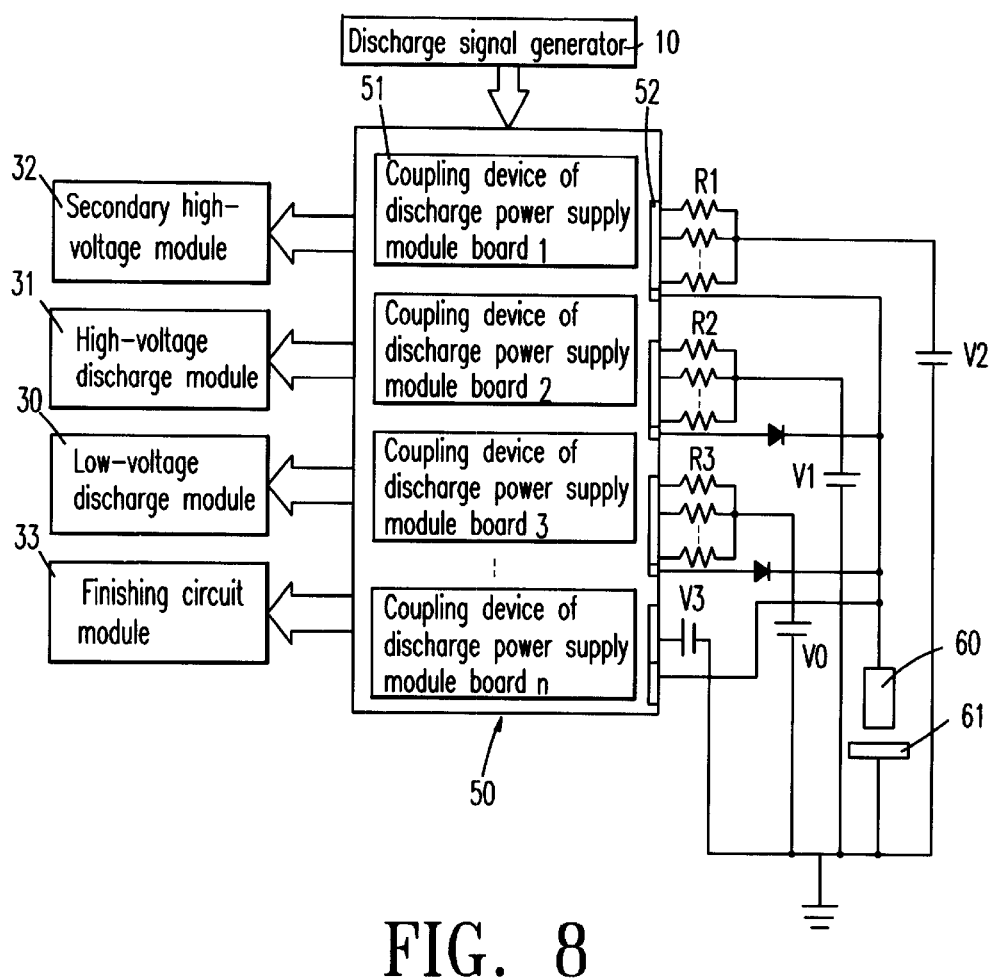
FIG. 8 shows a circuit diagram of the power supply modular device of the present electrical discharge machine.

In an application example of this invention shown in FIG. 8, the discharge power supply motherboard 50 serves as a bridge for jointing the discharge signal generator 10 to the discharge power supply modules 30–33, and provides the coupling devices 51 for settling the discharge power supply modules 30–33, which are jointed through the discharge circuit connectors 52 respectively with individual DC power supplies V0, V1, V2, V3, individual limit resistors R1, R2, R3, an electrode 60, and a workbench 61 to form a complete discharge power supply system circuit, wherein V0, V1, V2, V3 are: a low-voltage DC power supply, a high-voltage DC power supply, a secondary high-voltage DC power supply, and a finishing DC power supply, respectively.

The low-voltage discharge power supply module 30 is stacked in parallel with a multistage current for creating waveform arbitrarily applicable to reduce electrode consumption or produce current surge in $\mu s$ degree in single-shot discharge for eliminating the phenomenon of carbon accumulation. The high-voltage discharge power supply module 31 is used to introduce arc for raising discharge efficiency and working stability.

In addition to the multistage high-voltage power supply, this invention can be applied for generating a multistage arc introduction current to facilitate processing work pieces in different materials.

In the case of processing a large-scale mold or graphite, which usually requires a large current, this invention may expand current continuously in form of stacking to meet such a condition. For example, assuming a peak current ($I_p$) of 180 A is needed in some processing stage and the peak current ($I_p$) of a discharge power supply module is 60 A, 3 pieces of the same coupled in parallel will work just well enough.

Therefore, it is absolutely feasible to add another piece to satisfy planned current stages should one piece of the discharge power supply motherboard 50 fail to serve the system well. Moreover, when the arc-introduction time of the secondary high voltage for special processing is overlong, the secondary high-voltage discharge power supply module 32, the finishing discharge power supply module 33, etc., may be combined freely for solving problems.

Compared with conventional techniques, the merits of modular design of this invention may be highlighted to the following points:
Easy installation and maintenance
Flexible expansion
Least wiring and inductive effect
Wider applicable range In the above described, at least one preferred embodiment has been elucidated with reference to the drawings annexed, and it is apparent that numerous variations or modifications may be made without departing from the true spirit and scope thereof, as set forth in the claims below.

What is claimed is:

1. An electrical discharge power supply modular device for an electrical discharge machine, comprising:
a discharge signal generator capable of generating a discharge power supply control signal;
at least one discharge power supply motherboard having a plurality of coupling devices for discharge power supply module boards and a plurality of discharge circuit connectors;
a plurality of discharge power supply module boards plugged in said discharge power supply motherboard and disposed on respective ones of said plurality of coupling devices, such that the discharge power supply module boards are connected to a plurality of corresponding discharge power supply circuits through the discharge circuit connectors for flexibly building a multistage discharge power supply; and
a discharge power supply control signal bus for forwarding the discharge power supply control signal generated by said discharge signal generator to a specified discharge power supply module board and providing discharge pulses to said discharge power supply circuits for producing a discharge current;
wherein each discharge power supply module board comprises: a photocoupler for receiving the discharge power supply control signal; a driving stage for receiving a converted output signal derived from the received discharge power control signal; a post-stage switching circuit driven by the driving circuit; and a Metal Oxide Semiconductor Field Effect Transistor (MOSFET) for joining with the discharge power supply circuit to discharge pulses.

2. The discharge power supply modular device according to claim 1, wherein the plurality of discharge power supply module boards includes at least one of a low-voltage discharge module, a high-voltage discharge module, and a secondary high-voltage discharge module.

3. The discharge power supply modular device according to claim 2, wherein the plurality of discharge power supply module boards further includes a finishing circuit module.

4. The discharge power supply modular device according to claim 2, wherein the plurality of discharge power supply module boards further includes a special processing circuit module.

5. The discharge power supply modular device according to claim 2, wherein each of the plurality of discharge power supply module boards includes a discharge power supply module setting device for delivering the discharge power supply control signal received from the discharge power supply control signal bus to an assigned discharge power supply module and setting a discharge current stage, power supply mode and function of the assigned discharge power supply module for further control of discharge current and waveform.

6. The discharge power supply modular device according to claim 2, wherein each of the plurality of discharge power supply module boards is stacked in parallel with a multistage current to enable the low-voltage discharge module to generate an arbitrary waveform of the discharge current.

7. The discharge power supply modular device according to claim 6, wherein the discharge current is produced by selectively stacking more than one of the plurality of discharge power supply module boards in parallel.

8. The discharge power supply modular device according to claim 1, wherein each of the plurality of discharge power supply module boards further comprises at least an overload current protection device to turn off the photocoupler when the discharge current exceeds a rated maximum value.

9. The discharge power supply modular device according to claim 1, wherein more discharge power supply motherboards can be added for accommodating a surplus of discharge power supply module boards in case the plurality of coupling devices for the discharge power supply module boards on the at least one discharge power supply motherboard is insufficient in number.

10. The discharge power supply modular device according to claim 1, wherein each discharge power supply circuit comprises a plurality of limit resistors in individual current stages joined to respective discharge circuit connectors on the discharge power supply motherboard; and any arbitrary current stage of each limit resistor must not exceed a rated maximum current of the corresponding MOSFET transistor.

11. The discharge power supply modular device according to claim 1, wherein the post-stage switching circuit includes a snubber circuit.

12. An electrical discharge power supply modular device for an electrical discharge machine, comprising:
- a discharge signal generator capable of generating a discharge power supply control signal;
- at least one discharge power supply motherboard having a plurality of coupling devices for discharge power supply module boards and a plurality of discharge circuit connectors;
- a plurality of discharge power supply module boards plugged in said discharge power supply motherboard and disposed on respective ones of said plurality of coupling devices, such that the discharge power supply module boards are connected to a plurality of corresponding discharge power supply circuits through the discharge circuit connectors for flexibly building a multistage discharge power supply; and
- a discharge power supply control signal bus for forwarding the discharge power supply control signal generated by said discharge signal generator to a specified discharge power supply module board and providing discharge pulses to said discharge power supply circuits for producing a discharge current;

wherein the plurality of discharge power supply module boards includes at least one of a low-voltage discharge module, a high-voltage discharge module, and a secondary high-voltage discharge module, wherein the plurality of discharge power supply module boards further includes a finishing circuit module, and wherein the finishing circuit module comprises a photocoupler for receiving the discharge power supply control signal; and a means for conversion of the control signal into a signal level acceptable to a driving stage, the driving stage driving a post-stage high-speed switching circuit to bias a MOSFET transistor coupled to the discharge power supply circuit for generating discharge pulses.

13. The discharge power supply modular device according to claim 12, wherein the finishing circuit module further comprises a plurality of inductionless resistors in respective current stages disposed on the finishing circuit module.

* * * * *